UNITED STATES PATENT OFFICE.

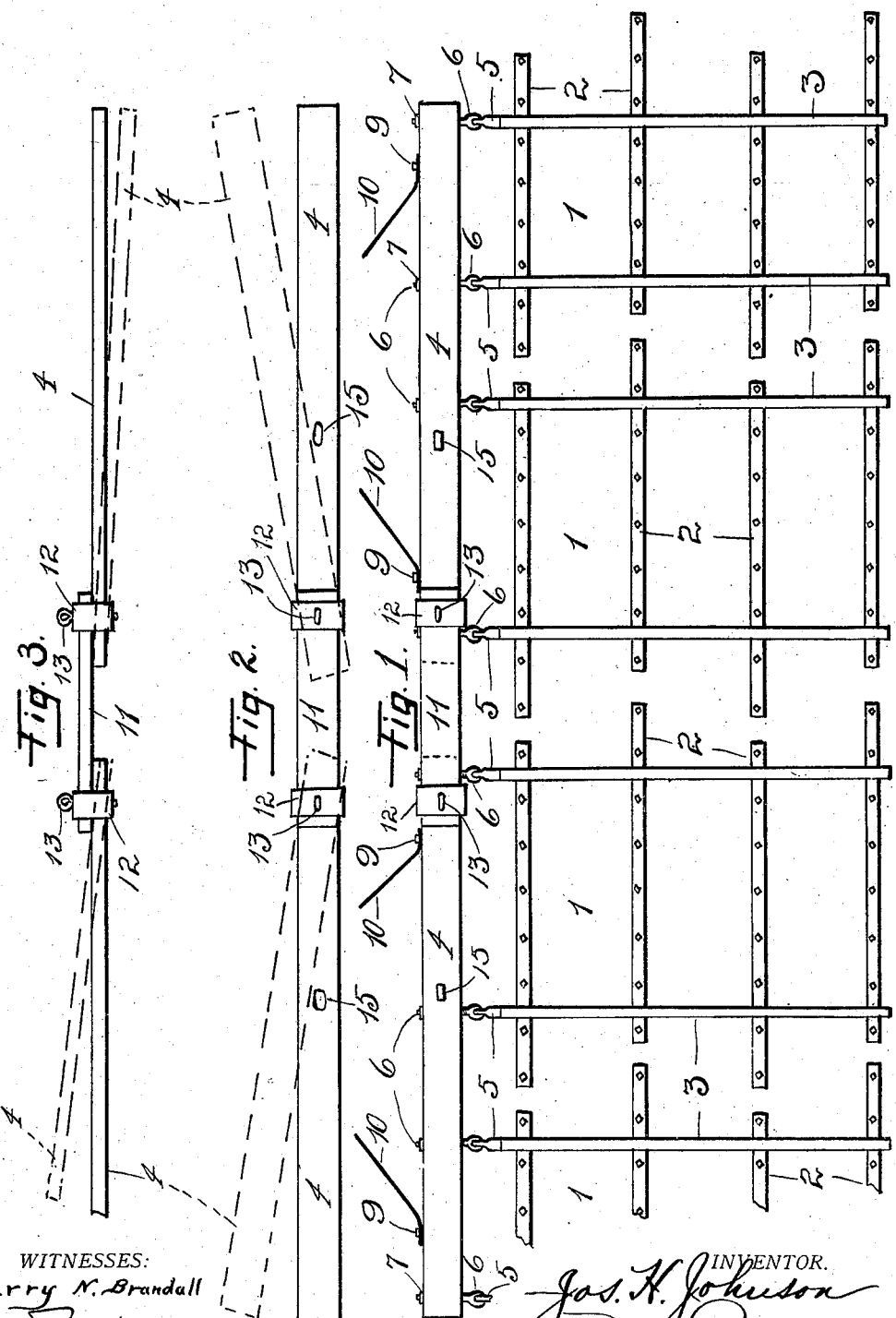

JOSEPH H. JOHNSON, OF NEAR ELMWOOD, ILLINOIS, ASSIGNOR OF ONE-HALF TO THOMAS L. GALPIN, OF GALESBURG, ILLINOIS.

HARROW.

No. 867,731.   Specification of Letters Patent.   Patented Oct. 8, 1907.

Application filed May 21, 1907. Serial No. 374,865.

*To all whom it may concern:*

Be it known that I, JOSEPH H. JOHNSON, a citizen of the United States, and a resident of near Elmwood, in the county of Peoria and State of Illinois, have invented a new and useful Harrow, of which the following is a specification.

My invention has relation to toothed harrows, and particularly to that class thereof in which a plurality of sections are employed, and which sections are hinged or otherwise connected to, to be drawn by a draft-bar or bars to which the draft-animals are attached.

In harrows of this character it has been the common practice to couple each pair of sections to a draft bar in one of two ways which I shall now describe. In the event of two, three or four sections being employed, said sections were sometimes coupled to a single long bar to which the draft animals were hitched, in which case the strain exerted by the doubletree-pin, (it being centrally longitudinally of said bar,) would often cause said bar to break at that point. With such draft-bar in use, when it is necessary to pass through a gate, (it being understood that a gate is ordinarily sixteen and a harrow of four sections from twenty to twenty-four feet in length,) or to cross a bridge, or even for local transportation over narrow roads or lanes, it has been imperative to remove a series of bolts and nuts, generally eight of each, and to replace them when beginning work, thus entailing a great loss of time and labor.

Another mode of attaching numerous-section harrows has been to couple each pair of sections to a short draft-bar, the ends of said bars being bolted together, usually by straps above and below. These short bars have been connected by straps apertured for the reception of bolts for holding them in place; or in other words, they have been connected by straps or links to each other and to a long draft bar to which the doubletrees are secured. This is an expensive construction and necessitates a long hitch, the draft animals being too far from the harrow to accomplish close work in turning at the ends of rows or bouts, and neither of the above described constructions permits of flexibility. And while I am aware that "flexible" harrows are not new in the art, I have sought and purposed to produce a connection for ordinary harrows of the type hereinbefore referred to which will flex in any direction and to any ordinary degree; which will permit of a close hitch; which will permit of turning within a short compass; which will permit of quick and ready detachment for passing through gates, for crossing bridges and for local transportation; which is as quickly re-assembled; which is drawn from the side, thus obviating center draft; which employs no long bar; which will be durable and which is inexpensive of manufacture.

Mechanism embodying the structural features of my improvements is shown in the accompanying drawings, in which:

Figure 1 is a plan, showing my improvements as embodied in a four-section harrow, partly broken away; Fig. 2 is a plan of the improvements alone, and Fig. 3, an elevation thereof.

In order that the invention may be better understood attention is called to the numerals on the drawings, the same one referring to the same part in the different figures thereof. The numerals 1 indicate harrow sections composed of transverse tooth-bars 2 and longitudinal frame-bars 3. At Fig. 1 I have shown a preferred construction, each of the two draft-bars 4 having connected thereto two harrow sections, preferably by hooks 5 fixed to or forming part of the bars 3, which hooks engage the eyes of bolts 6 passed through apertures in the draft bar 4 to which said sections are coupled, and being fixed by nuts 7.

It will be understood that the construction of the sections, their numbers and their mode of connection to the draft bars is optional, and that any ordinary ones, even old ones, may be readily attached to my improvements, it being only necessary to provide the bars 4 with suitable apertures for the reception of bolts or other connections to fit the connecting means of varying sections.

The draft-bars 4 are cut into suitable lengths and at their proximal ends are spaced an appropriate distance. Near their inner ends they are apertured for a purpose presently related, and each has fixed thereto by lag-screws 9, draft-rods 10 or other suitable connection for the doubletrees (not shown) to which the draft animals are hitched. Overlying their inner ends is a short connecting bar 11, apertured near its extremities, also for a purpose shortly described. An endless loop or band 12, (preferably of metal,) of such dimensions that the ends of a draft-bar and the connecting bar may move freely therein when assembled, is passed over such ends and normally held in place by an eye-bolt 13 dropped through perforations therein and through those before referred to in the draft and connecting bars.

In Fig. 2 I have by dot lines illustrated the ease with which the bars may flex in the event of an obstacle being met with near the midlength of the harrow. It will be evident that they may as freely flex in the opposite direction, or that either may be forward of the other. At Fig. 3 I have shown by dot lines the right hand draft-bar as having dropped into a depression in the soil, the other one as passing over a high place. Adaptability to freely flex in any and all of these ways is of vast importance where rough, uneven or stony ground is being stirred and broken up.

The draft-bars are short, and the draft is proportioned or equalized, none being applied at their centers or midlengths. It will be evident that in turning at the ends of rows of bouts a great strain is exerted about the middle of the draft, the inner harrow section acting as a fulcrum or pivot about which the others are dragged and which latter offer much resistance. It is here, *i. e.*, at the center, that most harrows are broken. In my construction an extremely short turn is permitted by the flexure of the three bars in the loops, and there is little or no strain on the connecting-bar.

On entering or leaving a field, one bolt 13 is all that is required to be withdrawn to disconnect or unite the draft-bars, and being an eye-bolt or the like, it may be done in an instant and without the use of tools. For local transportation both bolts are removed as last described, the connecting-bar slipped longitudinally of one of the draft-bars, and both bolts employed to hold it in place and out of the way, one of said bolts being seated in the aperture at the end of the draft-bar and one in an aperture 15 near the center of either bar 4.

Having thus described my invention, what I claim as new and desire to secure by Letters Patent, is:—

1. In harrows, spaced draft-bars by which the harrow sections are drawn, a connecting bar overlying said space and overlapping their proximal ends, means adapted to slip over the overlapping ends of the draft-bars and the connecting-bar, said means being of such dimensions that the ends of both the draft-bars and the connecting-bar are free to flex in all directions therein, and means for pivotally connecting all of said elements.

2. In harrows, spaced draft-bars by which the harrow sections are drawn, a connecting-bar overlying said space and overlapping their proximal ends, loops adapted to slip over the overlapping ends of said bars, said loops being of such dimensions that the ends of all of said bars are free to flex in all directions therein, and means for pivotally connecting all of said elements.

In testimony whereof I have hereunto set my hand this 15th day of May, 1907.

JOSEPH H. JOHNSON.

Witnesses:
 BERTHA KUNZ,
 H. M. RICHARDS.